United States Patent
Chuang et al.

(10) Patent No.: US 9,438,453 B2
(45) Date of Patent: Sep. 6, 2016

(54) METHOD AND CIRCUIT FOR ESTABLISHING NETWORK CONNECTION

(71) Applicant: REALTEK SEMICONDUCTOR CORPORATION, Hsinchu (TW)

(72) Inventors: Sheng-Fu Chuang, Taichung (TW); Liang-Wei Huang, Hsinchu (TW); Ching-Yao Su, Taichung (TW); Hsuan-Ting Ho, Taichung (TW)

(73) Assignee: REALTEK SEMICONDUCTOR CORPORATION, Hsinchu (TW)

( * ) Notice: Subject to any disclaimer, the term of this patent is extended or adjusted under 35 U.S.C. 154(b) by 0 days.

(21) Appl. No.: 14/812,233

(22) Filed: Jul. 29, 2015

(65) Prior Publication Data

US 2016/0065495 A1    Mar. 3, 2016

(30) Foreign Application Priority Data

Aug. 28, 2014   (TW) .............................. 103129762 A

(51) Int. Cl.
  *H04L 25/49*  (2006.01)
  *H04L 29/08*  (2006.01)

(52) U.S. Cl.
  CPC ........... *H04L 25/4919* (2013.01); *H04L 67/12* (2013.01)

(58) Field of Classification Search
  CPC .. H04L 47/805; H04L 67/12; H04L 25/4919
  See application file for complete search history.

(56) References Cited

U.S. PATENT DOCUMENTS

| | | | | |
|---|---|---|---|---|
| 5,870,428 A * | 2/1999 | Miller | ...................... | H04L 1/241 370/249 |
| 2002/0122503 A1* | 9/2002 | Agazzi | ................ | H03M 1/0624 375/316 |
| 2005/0024509 A1* | 2/2005 | Itani | ..................... | H04N 5/2352 348/255 |
| 2005/0055467 A1* | 3/2005 | Campana | .................. | H04L 7/10 709/253 |
| 2008/0069144 A1* | 3/2008 | Yu | ........................ | H04L 25/4908 370/476 |
| 2009/0003226 A1* | 1/2009 | Wang | ...................... | H04L 43/50 370/251 |
| 2010/0262848 A1* | 10/2010 | Bobrek | ................. | H04L 47/266 713/320 |
| 2012/0063295 A1* | 3/2012 | Bliss | ..................... | H04L 1/0001 370/216 |
| 2012/0192020 A1* | 7/2012 | Kreuchauf | ........... | H04B 1/7103 714/704 |
| 2014/0119381 A1* | 5/2014 | Diab | ....................... | H04L 67/12 370/431 |

OTHER PUBLICATIONS

Broadcom Corporation BroadR_Reach_Automotive_Spec_V3.0 BroadR-Reach Physical Layer Transceiver Specification for Automotive Applications, May 7, 2014.

* cited by examiner

*Primary Examiner* — Syed Haider
(74) *Attorney, Agent, or Firm* — WPAT, P.C., Intellectual Property Attorneys; Anthony King

(57) ABSTRACT

The present invention discloses a network connection establishing method capable of preventing a link procedure from being strangled in a training state. An embodiment of the method comprises: a preceding step; a training step; and a following step. Said training step includes at least one of the following: counting a number, and returning to the preceding step if a local receiver is not yet ready after finishing counting the number; detecting a reception signal according to a signal detection level, and returning to the preceding step when none of the reception signal is detected; determining a number of level(s) of the reception signal, and returning to the preceding step if the number of level(s) is less than an expected level number; and comparing a signal-to-noise ratio of the reception signal with a signal-to-noise threshold, and returning to the preceding step when the signal-to-noise ratio fails to satisfy the signal-to-noise threshold.

10 Claims, 3 Drawing Sheets

METHOD AND CIRCUIT FOR ESTABLISHING NETWORK CONNECTION

BACKGROUND OF THE INVENTION

1. Field of the Invention

The present invention relates to a network connection establishing method and circuit, especially to a network connection establishing method and circuit capable of preventing a link procedure from being strangled in a training state.

2. Description of Related Art

As more and more end applications (such as security applications or entertainment applications) become available, the automobile industry puts more emphasis on vehicular communication. Nowadays Ethernet technology is regarded as a solution for vehicular communication, and the automobile industry has established OPEN (One Pair Ether-Net) alliance to promote BroadR-Reach technology as the standard technology (hereafter, vehicular Ethernet proposal) for vehicular communication. The connection establishment course of the vehicular Ethernet proposal goes through several states, and one of them is a training state operable to verify the statuses of receivers of two linking partners. However, if a network cable came off due to vibration or was detached manually during the training state, the connection establishment course in compliance with the current vehicular Ethernet proposal will be strangled in the training state, which means that the connection procedure will not be able to move on to the next step or go back to the preceding step, and the whole connection mechanism will be paralyzed.

People who are interested in the vehicular Ethernet proposal may refer to the following document: Broadcom Corporation, "BroadR-Reach Physical Layer Transceiver Specification For Automotive Applications", v3.0, May 7, 2014.

SUMMARY OF THE INVENTION

In view of the problem of the prior art, an object of the present is to provide a network connection establishing method and circuit capable of preventing a link procedure from being strangled in a training state.

The present invention discloses a method for establishing network connection, capable of preventing a link procedure from being strangled in a training state. An embodiment of the method comprises: at least a preceding step carried out for network connection before entering the training state; a training step carried out after entering the training state and operable to verify at least one of the statuses of a local receiver and a remote receiver; and at least a later step carried out after leaving the training state and operable to transmit signal or prepare network connection again. The said training step includes at least one of the following steps: counting a number, and returning to the preceding step if the local receiver is not yet ready after finishing counting the number; detecting a reception signal according to a signal detection level, and returning to the preceding step if none of the reception signal is detected; determining a number of level(s) of the reception signal, and returning to the preceding step if the number of level(s) is less than an expected level number; and comparing a signal-to-noise ratio of the reception signal with a signal-to-noise threshold, and returning to the preceding step if the signal-to-noise ratio fails to satisfy the signal-to-noise threshold.

The present invention also discloses a circuit for establishing network connection, capable of preventing a link procedure from being strangled in a training state. An embodiment of the circuit comprises a physical layer circuit (PHY) and at least one of the following units: a counting unit operable to count a number during the training state, and make the PHY return to a preceding step if a local receiver is not yet ready after finishing counting the number; a detecting unit operable to detect a reception signal according to a signal detection level during the training state, and make the PHY return to the preceding step if none of the reception signal is detected; a determining unit operable to determine a number of level(s) of the reception signal during the training state, and make the PHY return to the preceding step if the number of level(s) is less than an expected level number; and a comparing unit operable to compare a signal-to-noise ratio of the reception signal with a signal-to-noise threshold during the training state, and make the PHY return to the preceding step if the signal-to-noise ratio fails to satisfy the signal-to-noise threshold.

These and other objectives of the present invention will no doubt become obvious to those of ordinary skill in the art after reading the following detailed description of the preferred embodiments that are illustrated in the various figures and drawings.

DETAILED DESCRIPTION OF THE PREFERRED EMBODIMENTS

The following description is written by referring to terms acknowledged in this invention field. If any term is defined in the specification, such term should be explained accordingly. Besides, the connection between objects or events in the disclosed embodiments can be direct or indirect provided that these embodiments are still found practicable under such connection. Said "indirect" means that an intermediate object or a physical space is existed between the objects, or an intermediate event or a time interval is existed between the events. In addition, the following description relates to network connection establishment such as vehicular network connection establishment or other suitable kinds of network connection establishment. Furthermore, the explanation of well known techniques or principles in this field will be omitted if such known techniques or principles have nothing or little to do with the feature of the present invention.

Figure 1:
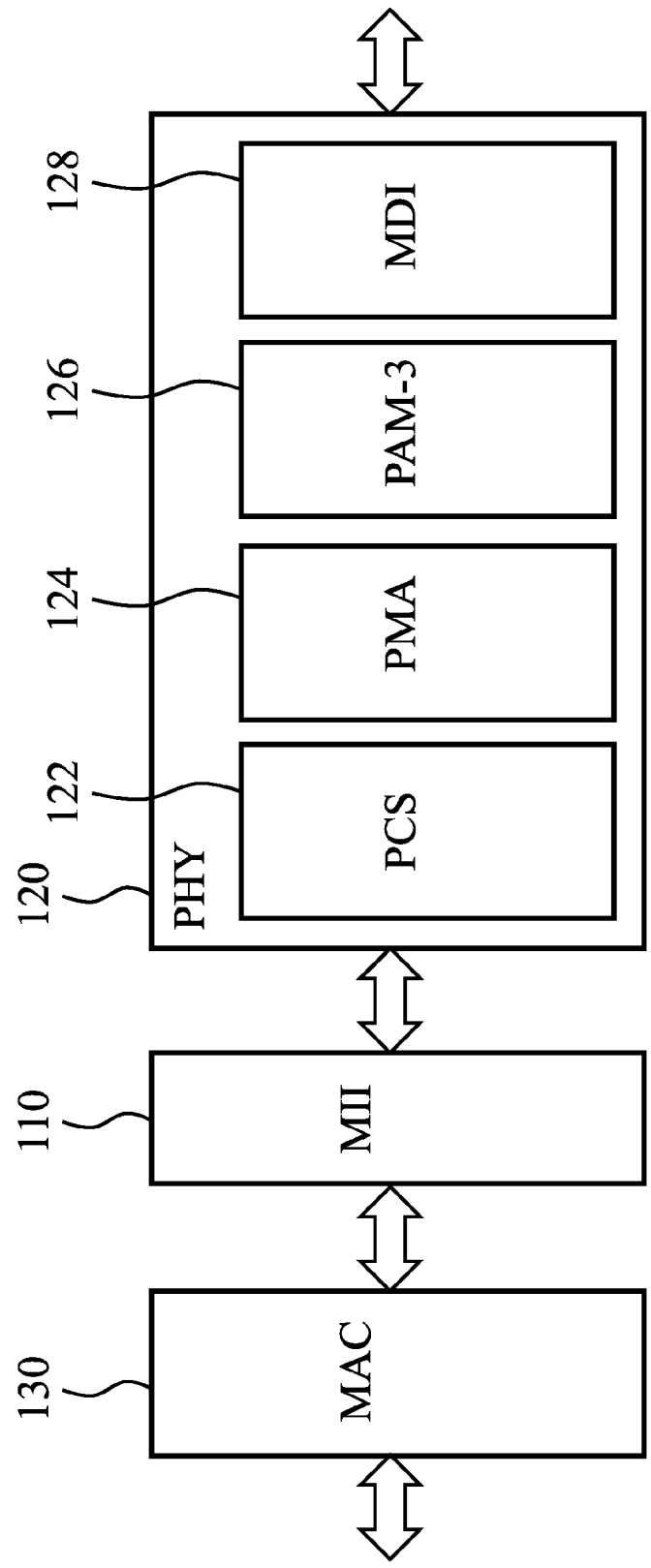
FIG. 1 illustrates the vehicular Ethernet configuration.

The present invention comprises a method and a circuit for establishing network connection. The method and circuit are capable of preventing a link procedure from being strangled in a training state, and compatible with BroadR-Reach technology (hereafter vehicular Ethernet proposal) or other suitable network standards (e.g., IEEE 802.3 standard). Taking vehicular Ethernet proposal, its configuration 100 is shown in FIG. 1, including: a media independent interface (MII) 110, a physical layer circuit (PHY) 120, and a media access controller (MAC) 130. The PHY 120 includes: a physical coding sublayer (PCS) 122, a physical medium attachment sublayer (PMA) 124, a pulse amplitude modulation 3 (PAM-3) 126, and a media dependent interface (MDI) 128. People who are interested in the operation of the above-mentioned configuration and circuits may refer to the following documents: Broadcom Corporation, "BroadR-Reach Physical Layer Transceiver Specification For Automotive Applications", v3.0, May 7, 2014; and IEEE 802.3 standard. The present invention is applicable to the operation control and/or the hardware design of the PHY 120.

Figure 2:
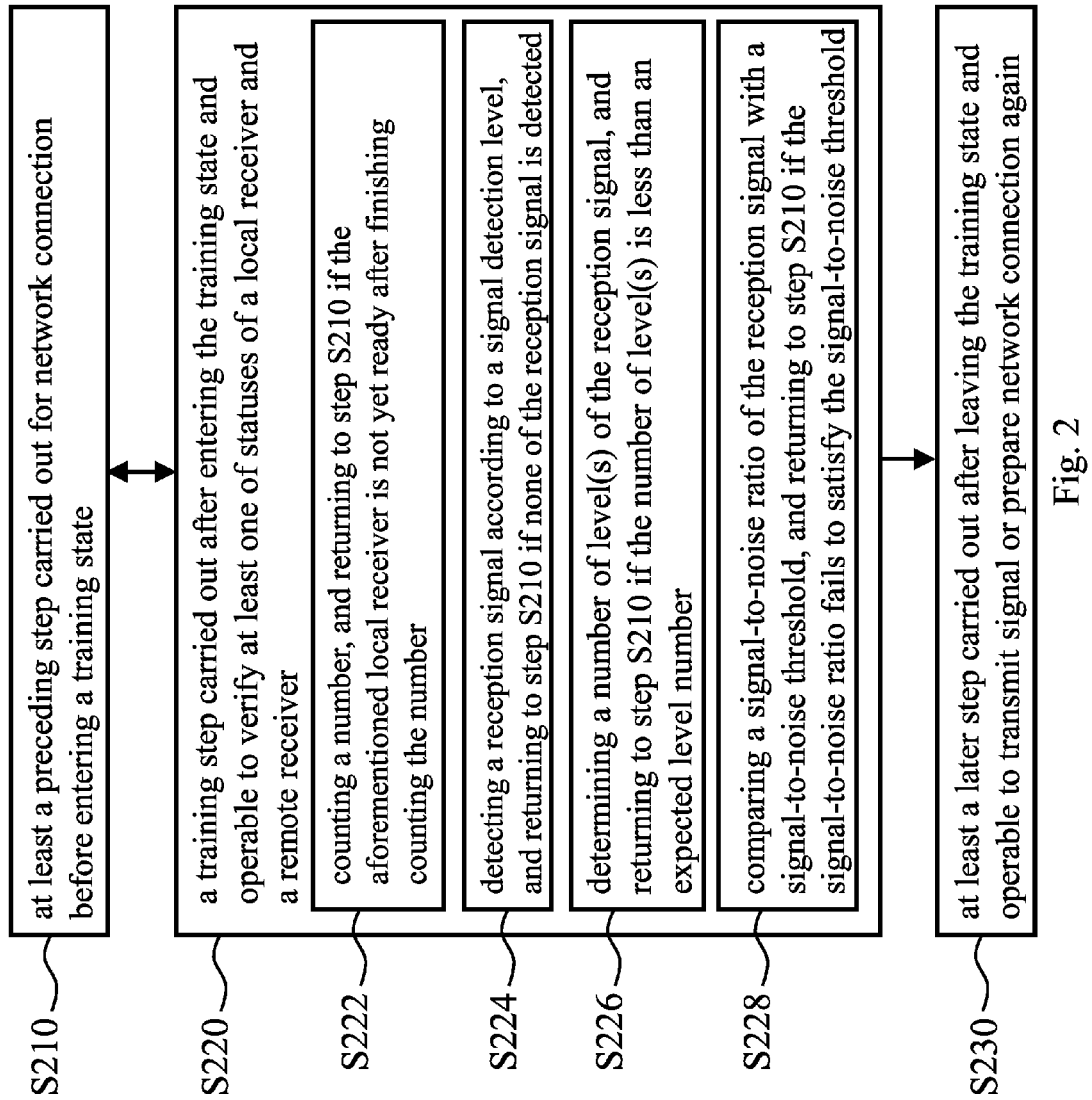
FIG. 2 illustrates an embodiment of the network connection establishing method of the present invention.

Please refer to FIG. 2 which illustrates an embodiment of the network connection establishing method of the present invention. This embodiment comprises the following steps:

Step S210: at least a preceding step carried out for network connection before entering a training state (e.g., the training state defined by the vehicular Ethernet proposal). For instance, when the present embodiment is applied to vehicular Ethernet, the preceding step includes a Slave Silent step as it is explained in the vehicular Ethernet proposal. Since the preceding step alone is known in this field or free to be defined by those carrying out the present invention, the detail thereof is therefore omitted.

Step S220: a training step carried out after entering the training state and operable to verify at least one of the statuses of a local receiver and a remote receiver. An illustration of the training step is recited in the vehicular Ethernet proposal. In this embodiment, the training step includes at least one of the following steps:

Step S222: counting a number (that is to say waiting for a predetermined time), and returning to the preceding step (i.e., step S210) if the aforementioned local receiver is not yet ready (or the link procedure still stays in the training state) after finishing counting the number. Step S222 could be realized by the cooperation of a counter and a finite state machine or the equivalent thereof. In detail, in the conventional vehicular Ethernet proposal, after waiting for a minimum time in the training state, if the statuses of the local receiver and the remote receiver are ready, the link procedure will leave the training state and enter a state to send an idle signal or a data signal; if the status of the local receiver is ready but the status of the remote receiver is not ready, the link procedure will leave the training state and enter a state to send an idle signal; and if the status of the local receiver is not ready (because of a cause such as a network cable coming off due to vibration or being detached manually during the training state), the link procedure will be strangled in the training state and can't move on to a next step (e.g., the later step of step S230) or go back to the preceding step, and thereby will remain in the training state. To solve the above-described problem, step S222 is operable to make the link procedure decide whether to go back to the preceding step by counting, and thereby operable to prevent the link procedure from being strangled in the training state. The time for the counting action here is equal to or longer than the above-mentioned minimum time; if the time for the counting action is equal to the minimum time, step S222 will decide whether to go back to step S210 according to the completion of the counting action and the status of the local receiver (or the type of state to which the link procedure corresponds); and if the time for the counting action is longer than the minimum time, when the counting action finishes and the result of the counting action is taken for reference (which implies that the link procedure is still in the training state), step S222 will decide to go back to step S210. It should be noted that the status of the local receiver or the state where the link procedure stays can be found through conventional techniques.

Step S224: detecting a reception signal according to a signal detection level, and returning to the preceding step (i.e., step S210) if none of the reception signal is detected. This step can detect whether the reception signal exists through analyzing analog-to-digital conversion output values of the reception signal, and then ask the link procedure to go back to step S210 through the operation of a finite state machine or the equivalent thereof. For instance, by executing a comparison process, when step S224 finds that the sum, the average or some self-defined calculation result of the digital output values which are collected by a prescribed number or a prescribed time is less than the signal detection level, step S224 determines that none of the reception signal is detected, and makes the link procedure returns to step S210. More specifically, because the link procedure of the conventional vehicular Ethernet proposal (that is to say the prior art) lacks step S224, it can't deal with the occurrence of the status of the local receiver unready in the training sate (in which the unready status may be associated with a problem such as a network cable coming off due to vibration or being detached manually) and thereby remains in the training state when the said problem occurs. Compared with the prior art, step S224 of the present invention can determine whether the link procedure should go back to the preceding step by detecting the reception signal, and thereby prevents the link procedure from being strangled in the training state.

Step S226: determining a number of level(s) of the reception signal, and returning to the preceding step (i.e., step S210) if the number of level(s) is less than an expected level number. For instance, if the present embodiment is applied to vehicular Ethernet, since the transmission signal of the vehicular Ethernet configuration (as it is shown in FIG. 1) is a pulse amplitude modulation 3 (PAM-3) signal, the reception signal should reflect three levels (e.g., 0, +, −) in a prescribed time or through a prescribed number of sampled signals. Therefore, if step S226 finds that the number of levels of the reception signal is less than the expected level number (which is three in this instance), step S226 can determine the reception signal abnormal and make the link procedure go back to step S210. The said number of levels can be found through a comparator to compare the level of the sampled analog reception signal with a plurality of predetermined levels, or through analyzing the analog-to-digital conversion output values (e.g., a plurality of binary values) of the reception signal; and the action of returning to step S210 can be controlled by a finite state machine or the equivalent thereof. Compared with the present invention, the link procedure of the conventional vehicular Ethernet proposal can't determine whether the connection is normal, and therefore the situation of the link procedure being strangled in the training state may occur. On the contrary, step S226 can decide whether the link procedure should go back to the preceding step by the determination of the number of level(s), so as to prevent the link procedure from being strangled in the training state.

Step S228: comparing a signal-to-noise ratio of the reception signal with a signal-to-noise threshold, and returning to the preceding step (i.e., step S210) if the signal-to-noise ratio fails to satisfy the signal-to-noise threshold. To be more specific, if the signal-to-noise ratio of the reception signal is too low, it means that the reception signal can't be effectively detected or the reception signal could be some signal such as noise other than a normal idle signal or a normal data signal; in the meantime, step S228 will make the link procedure go back to step S210. The above-mentioned comparison could be done through a comparator or the equivalent thereof, and the action of returning to step S210 could be controlled by a finite state machine or its equivalent. In this embodiment, the signal-to-noise threshold is a value between ten and nineteen; however, people who carry out the present invention can set the signal-to-nose threshold in accordance with their own demand or design. More specifically, since the link procedure of the convention vehicular Ethernet proposal is not able to determine whether the connection is normal by referring to the signal-to-noise ratio, the situation of the link procedure being strangled in the training state may occur. On the contrary, step S228 can decide whether the link procedure should go back to the preceding step in accordance with the comparison between the signal-to-noise ratio and the signal-to-noise threshold, so that it can prevent the link procedure from being strangled in the training state.

Step S230: at least a later step carried out after leaving the training state and operable to transmit signal or prepare network connection again. For instance, when the present embodiment is applied to vehicular Ethernet, the later step includes a step of transmitting an idle signal or a data signal, and the illustration thereof can be found in the vehicular Ethernet proposal. Since the later step alone is known in this field or free to be defined by those carrying out the present invention, the detail thereof is therefore omitted here.

On the basis of the above, in consideration of that a signal reception procedure of network connection may be used to modify the reception signal by a digital gain adjustment for the convenience of processing signal, if the digital gain adjustment sets the digital gain to be zero while the link procedure in the training state has a problem, a situation that the signal-to-noise ratio of the reception signal is very high but and the number of level(s) is one will occur; as a result, step S228 might wrongly take the reception signal to be normal and accordingly it won't make the link procedure go back to step S210. In view of the above-mentioned problem, the present embodiment (e.g., step S228) may further include: setting a digital gain to prevent the digital gain from being zero. For instance, the present embodiment may set the digital gain to be a value between three and eight; however, this setting could be made by those carrying out the present invention in accordance with their own demand or design. Generally speaking, any digital gain that is suitable for the link procedure to resolve the reception signal with multiple levels (e.g., three levels) is applicable here.

Figure 3:
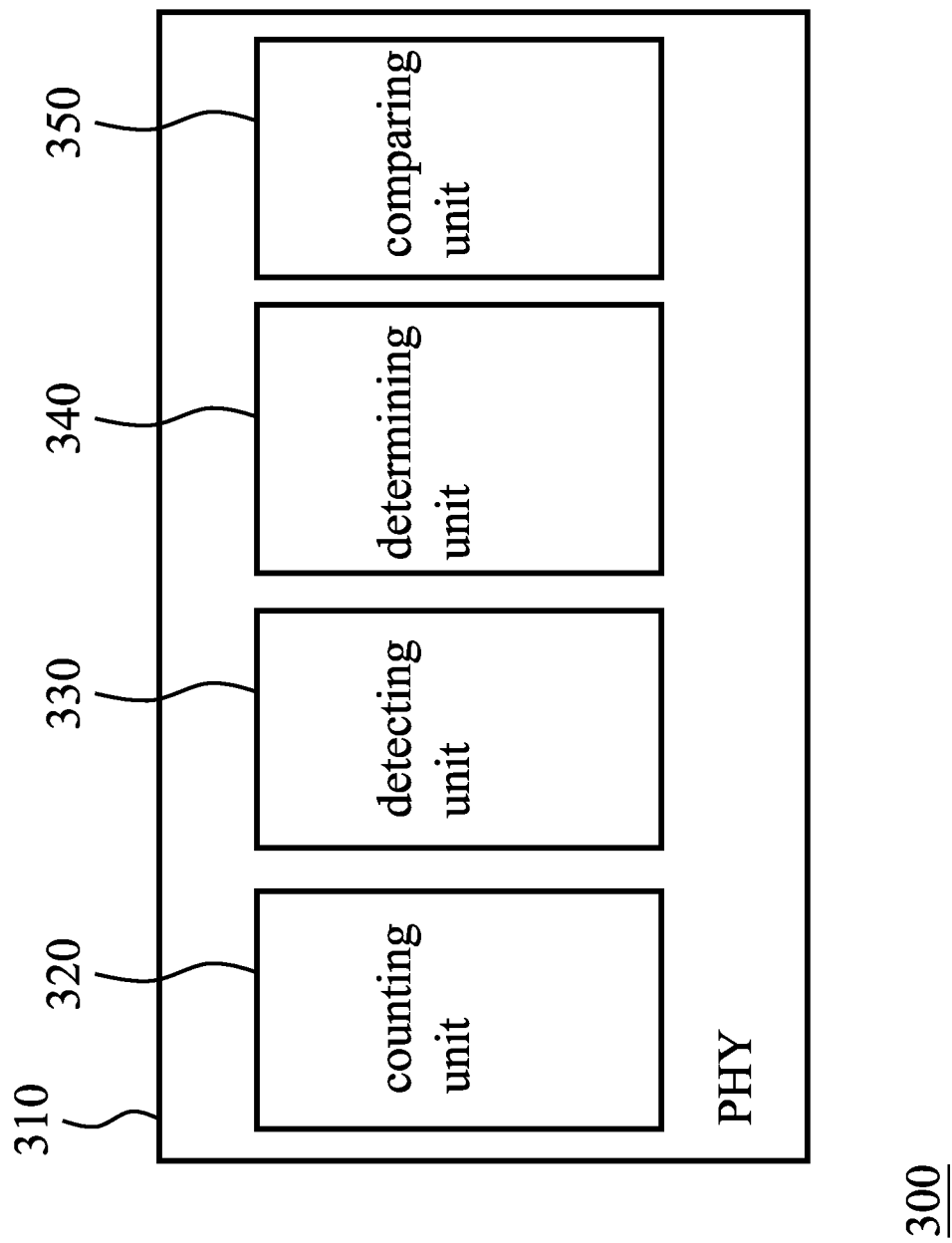
FIG. 3 illustrates an embodiment of the network connection establishing circuit of the present invention.

In addition to the aforementioned method, the present invention also discloses a circuit for establishing network connection, which is also capable of preventing a link procedure from being strangled in a training state. As it is shown in FIG. 3, an embodiment of the circuit 300 comprises a physical layer circuit (PHY) 310 and at least one of the following units: a counting unit 320; a detecting unit 330; a determining unit 340; and a comparing unit 350. The said counting unit 320 is operable to count a number during the training state, and make the PHY 310 return to a preceding step if a local receiver is not yet ready (or the link procedure still stays in the training state) after the counting unit 320 finishing counting the number, wherein the preceding step is executed before the link procedure enters the training state and includes one or more steps such as the aforementioned step S210. The said detecting unit 330 is operable to detect a reception signal according to a signal detection level during the training state, and make the PHY 310 return to the preceding step if none of the reception signal is detected. The said determining unit 340 is operable to determine a number of level(s) of the reception signal during the training state, and make the PHY 310 return to the preceding step if the number of level(s) is less than an expected level number. The said comparing unit 350 is operable to compare a signal-to-noise ratio of the reception signal with a signal-to-noise threshold during the training state, and make the PHY 310 return to the preceding step if the signal-to-noise ratio fails to satisfy the signal-to-noise threshold. In this embodiment, the circuit 300 for establishing network connection is compatible with the vehicular Ethernet proposal, and is operable to act as a master or a slave for network connection establishment. Of course, the present embodiment can be applied to other network standards, if practicable. Besides, in this embodiment the counting unit 320, the detecting unit 330, the determining unit 340 and the comparing unit 350 pertain to the PHY 310; however, in an alternative embodiment, some or all of these units can be set outside the PHY 310.

Similarly, in consideration of that a signal reception procedure of network connection might set a digital gain to be zero and cause a problem that the signal-to-noise ratio of the reception signal is very high but and the number of level(s) is one, the circuit 300 for establishing network connection in this embodiment may further include: a digital gain control unit (not shown) included in the PHY 310 or independent of it, operable to set a digital gain to prevent the digital gain from being zero. Besides, in this embodiment the detecting unit 330 may detect whether the reception signal actually exists (or whether the detected reception signal is reliable, eligible, or meaningful) in accordance with the analog-to-digital conversion output values of the reception and the signal detection level. For instance, the detection may be executed according to the sum, the average or some self-defined calculation result of the digital output values. Of course, the detecting unit 330 may detect the analog form of the reception signal. In addition, the determining unit 340 here is operable to make determination with the expected level number which is three, so as to abide by the design of PAM-3; however, the expected level number can be set to be some other value as the demand or design changes. Furthermore, the comparing unit 350 here is operable to do comparison with the signal-to-noise threshold which is between ten and nineteen; but those carrying out the present invention may set the signal-to-noise threshold by themselves according to their own demand or design.

Since people of ordinary skill in the art can appreciate the detail and modification of the embodiment of FIG. 3 by referring to the illustration of FIGS. 1, 2 and the explanation thereof, which implies that the features of the fore-disclosed method embodiments and the modifications thereof can be reasonably applied to the circuit 300, repeated and redundant explanation is therefore omitted while the current disclosure is believed to be enough for understanding and enablement. Moreover, the sequence of steps and the shape, size, scale and etc. of elements in the figures of this specification are merely illustrative for understanding, not limitations in the scope of the present invention.

Please note that each embodiment in this specification includes one or more features; however, this doesn't mean that one carrying out the present invention should make use of all the features of one embodiment at the same time, or should only carry out different embodiments separately. In other words, if an implementation derived from one or more of the embodiments is applicable, a person of ordinary skill in the art can selectively make use of some or all of the features in one embodiment or selectively make use of the combination of some or all features in several embodiments to have the implementation come true, so as to increase the flexibility of carrying out the present invention.

To sum up, the method and circuit of the present invention for establishing network connection are compatible with the vehicular Ethernet proposal (i.e., the BroadR-Reach technology) or other suitable network standards. Compared with the vehicular Ethernet proposal, the present invention can prevent the link procedure from being strangled in the training state, and can not only prevent the link procedure from being paralyzed, but also be helpful to remind a system making use of the present invention or a user using the system of an abnormal status timely.

The aforementioned descriptions represent merely the preferred embodiments of the present invention, without any intention to limit the scope of the present invention thereto. Various equivalent changes, alterations, or modifications based on the claims of present invention are all consequently viewed as being embraced by the scope of the present invention.

What is claimed is:

1. A circuit for establishing network connection, capable of preventing a link procedure from being strangled in a training state, comprising a physical layer circuit (PHY), a counting unit operable to count a number during the training state and make the PHY return to a Slave Silent step of BroadR-Reach technology if a local receiver is not ready after finishing counting the number, and all of the following units:
   a detecting unit operable to detect a reception signal according to a signal detection level during the training state, and make the PHY return to the Slave Silent step if none of the reception signal is detected;
   a determining unit operable to determine a number of level(s) of the reception signal during the training state, and make the PHY return to the Slave Silent step if the number of level(s) is less than an expected level number; and
   a comparing unit operable to compare a signal-to-noise ratio of the reception signal with a signal-to-noise threshold during the training state, and make the PHY return to the Slave Silent step if the signal-to-noise ratio fails to satisfy the signal-to-noise threshold.

2. The circuit for establishing network connection of claim 1, wherein the counting unit, the detecting unit, the determining unit and the comparing unit pertain to the PHY.

3. The circuit for establishing network connection of claim 1, further comprising:
   a digital gain control unit operable to prevent a digital gain from being zero.

4. The circuit for establishing network connection of claim 1, wherein the detecting unit is operable to detect the reception signal according to a plurality of analog-to-digital converted output values and the signal detection level.

5. The circuit for establishing network connection of claim 1, wherein the expected level number is 3.

6. The circuit for establishing network connection of claim 1, wherein the signal-to-noise threshold is between ten and nineteen.

7. The circuit for establishing network connection of claim 4, wherein the detecting unit is operable to detect the reception signal according to the sum or average of the analog-to-digital converted output values and the signal detection level.

8. A circuit for establishing network connection, capable of preventing a link procedure from being strangled in a training state, comprising a physical layer circuit (PHY) and all of the following units:
   a counting unit operable to count a number during the training state, and make the PHY return to a preceding step if a local receiver is not ready after finishing counting the number;
   a detecting unit operable to detect a reception signal according to a signal detection level during the training state, and make the PHY return to the preceding step if none of the reception signal is detected;
   a determining unit operable to determine a number of level(s) of the reception signal during the training state, and make the PHY return to the preceding step if the number of level(s) is less than an expected level number; and
   a comparing unit operable to compare a signal-to-noise ratio of the reception signal with a signal-to-noise threshold during the training state, and make the PHY return to the preceding step if the signal-to-noise ratio fails to satisfy the signal-to-noise threshold.

9. The circuit for establishing network connection of claim 8, further comprising: a digital gain control unit operable to prevent a digital gain from being zero.

10. The circuit for establishing network connection of claim 8, wherein the detecting unit is operable to detect the reception signal according to the sum or average of a plurality of analog-to-digital converted output values and the signal detection level.

* * * * *